(12) United States Patent
Roys

(10) Patent No.: US 7,096,889 B1
(45) Date of Patent: Aug. 29, 2006

(54) FLUID DIVIDER BLOCK SUITABLE FOR USE AT HIGH PRESSURES

(76) Inventor: Curtis Roys, 3201 W. Wall St., Midland, TX (US) 79701

( * ) Notice: Subject to any disclaimer, the term of this patent is extended or adjusted under 35 U.S.C. 154(b) by 153 days.

(21) Appl. No.: 10/816,212

(22) Filed: Apr. 1, 2004

Related U.S. Application Data

(60) Provisional application No. 60/459,403, filed on Apr. 1, 2003.

(51) Int. Cl.
*F16K 11/10* (2006.01)

(52) U.S. Cl. .................................. 137/884; 184/7.4

(58) Field of Classification Search ............ 137/269, 137/271, 884; 184/6, 7.4
See application file for complete search history.

(56) References Cited

U.S. PATENT DOCUMENTS

| | | | |
|---|---|---|---|
| 4,082,324 A * | 4/1978 | Obrecht ................... | 285/124.5 |
| 4,312,425 A * | 1/1982 | Snow et al. ................ | 184/7.4 |
| 4,572,331 A * | 2/1986 | Powell et al. ............... | 184/7.4 |
| 5,285,871 A * | 2/1994 | Sievenpiper ............... | 184/7.4 |
| 5,605,179 A * | 2/1997 | Strong, Jr. et al. .......... | 137/884 |
| 5,810,115 A * | 9/1998 | Mismas ..................... | 184/7.4 |
| 5,835,372 A   | 11/1998 | Roys et al. | |
| 6,085,783 A * | 7/2000 | Hollingshead .............. | 137/597 |

\* cited by examiner

*Primary Examiner*—John Fox
(74) *Attorney, Agent, or Firm*—Hilgers, Bell & Richards LLP; Michael O. Scheinberg

(57) ABSTRACT

The invention is a divider block assembly suitable for use at high fluid pressures. Applicant has found that divider blocks in common use deform sufficient at high pressures to have an adverse affect on accurate fluid delivery and component longevity. A preferred high pressure divider block uses divider block sections engineered for high pressure applications with substantially thicker material surrounding the piston bore, utilizing precise bolt placement on the divider block sections to ensure even pressure to prevent distortion of the piston bore, and engineered base plate inlet and end sections that allow mounting of divider blocks without the addition of extra intermediate sections to reduce leak paths and bolts to secure the base together more firmly, all bolts being torqued to prevent distortion while sealing fluid passages. The use of any of these aspects separately can improve performance, and not all are required in every embodiment.

24 Claims, 10 Drawing Sheets

FLUID DIVIDER BLOCK SUITABLE FOR USE AT HIGH PRESSURES

This application claims priority from U.S. Provisional Application No. 60/459,403, file Apr. 1, 2003, which is hereby incorporated by reference.

TECHNICAL FIELD OF THE INVENTION

The present invention relates to high pressure, low volume fluid flow systems.

BACKGROUND OF THE INVENTION

Without adequate lubrication, industrial tools and machines, such as compressors can be seriously damaged or destroyed. In many applications, a pump pressurizes a lubricant, which is then distributed to multiple lubrication points using a device referred to as a "divider block" or "divider valve." In a divider block, the pressurized lubricant causes a set of pistons to move back and force in within piston bores, the moving pistons opening and closing internal fluids channels, so that a known volume of fluid is distributed to multiple outlet channels, once for every cycle of the group of cylinders. Because the pistons in the divider block are powered by the pressure of the fluid being distributed, no additional source of power is necessary to operate the divider block.

Divider blocks have been used to distribute lubricating oil to compressors for about fifty years, and they have changed little since their introduction. Because of the relative simplicity of divider blocks, users have been confident that divider blocks accurately distribute a fixed quantity of lubricant or other fluid to each outlet during each cycle of the divider block. When lubricated equipment fails, a technician will typically check to see that the divider block is cycling, and then assume that the equipment failure was not caused by a lack of lubrication. It has been observed that pistons within divider blocks occasionally wear out, but that is typically attributed to the large number of cycles and the close fit of the piston within the cylinder.

FIG. 1 shows the construction of a typical prior art divider block 100. Divider block 100 is built from multiple sections, including a base plate 102 and multiple divider block sections 104 mounted on the base plate 102. Each divider block section 104 includes an internal piston (not shown) within a bore (not shown). The base plate 102 is comprised of multiple sections, including an inlet section 108 connected to a pressurized fluid source (not shown), one or more intermediate base plate sections 110, and an end section 112. A divider block section 104 is mounted on each intermediate base plate section 110.

The inlet section 108, end section 112, and intermediate base plate sections 110 include internal channels (not shown) for fluid movement and holes for moving fluid between adjacent sections of base plate 102. Each intermediate base plate sections 110 also includes an outlet (not shown) for dispensing the fluid, and holes for moving fluid in and out of the corresponding divider block sections 104.

Divider block sections 104 are typically available in a variety of bore sizes. Sizes are indicated as thousandth of a cubic inch displacement, such as sizes 6, 9, 12, 18, 24, and 30. In some divider blocks, inlet section 108 and/or the end section 112 are formed from a block that also includes an intermediate base plate. Additional intermediate base plate sections 110 can be inserted, along with corresponding divider block sections 102, to provide as many fluid outlets as necessary.

As shown in FIG. 1, each divider block section 104 is typically bolted to its corresponding intermediate base plate 110 using two bolts 120. The bolt holes are not positioned along a center line of the divider block section 104, because centered bolt holes would interfere with internal fluid passages. The bolt heads are typically recessed in a counter bore in the divider block section 104. The end section 112, inlet section 108, and intermediate base plates 110 are also bolted together using three bolts with threads on each end and a nut to tighten the manifold pieces together. Another design to bolt the inlet, intermediate and end section base plates 110 together uses hollow bolts with threads on the inside and outside, solid bolts that are inserted into the hollow bolts to manifold the intermediate and end sections together. The insert is threaded into one intermediate base plate 110, and then a bolt (not shown) through the next intermediate base plate 110 is threaded into the internal threads of the insert. This arrangement allows any number of intermediate base plates to be connected together.

FIG. 2 shows a base plate 102 including three intermediate base plate sections 110 without divider block sections 104. FIG. 2 shows holes 210 though which fluid passes between the base plate sections 110 and divider block sections 104, and threaded holes 212 for receiving mounting bolts 120. FIG. 3 shows a side view of a base plate 102 of FIG. 1, showing the three intermediate base sections 110, the input section 108, and the end section 112. Each intermediate base section 110 includes an outlet port 312. Outlet port 312 typically includes internal pipe threads so that an outlet pipe can screw directly into output port 312.

FIG. 4 shows a cross-section of a divider block section 104. Within a piston bore 400 is positioned a piston 402. Piston 402 typically includes two sections 404 of reduced diameter separating three sections 406 having a diameter that just fits within bore 400. Fluid can readily pass around sections 404, whereas fluid does not readily pass around sections 406, thereby allowing fluid pressure to move piston 402. The piston clearance within a piston bore is typically designed to be about 0.0003 inches (three ten-thousandths of an inch). A plug 408 is shown at one end of the bore 400. Bolt holes 410 are used for passage of bolts 120 that connect divider block section 402 to an intermediate base section 110, and indicator ports 412 are used to allow oil to either pass through the port or to be exposed in the port for trouble shooting purposes 414. FIG. 5 shows a front view of the divider block section 104 of FIG. 1. FIG. 5 shows bolt holes 410 and plugs 504 in indicator ports 412. FIG. 6 shows an end view of a divider block section 110 without plug 408, so piston 402 is visible in piston bore 400. This end view also shows the thin wall of metal on the top of the piston, which is associated with failure of the piston to dispense accurate volumes of fluid in high pressure applications.

Over the years, industry has been experiencing unexplained equipment failures or reduced equipment life. Examination of the divider block used to lubricate the failed equipment often shows that the divider block is cycling properly, thereby leaving the cause of the failure a mystery.

SUMMARY OF THE INVENTION

An object of the invention is to provide a reliable divider block for use at high pressures.

Applicant has found that at high pressures, conventional divider blocks deform and may not accurately dispense the required volume of fluid. The pressure at which divider blocks operate has gradually increased over the years, and industry has not noticed that as the pressure has increased, the accuracy of the volume of fluid dispensed by the divider blocks has decreased.

Applicant has found that with increased pressure, piston bores deform, and the pistons can fail to deliver the expected quantity of fluid, causing equipment failure or excess wear because of insufficient lubrication. Because the clearance of the piston within the bore is very small to prevent fluid from bypassing the piston, even a slight deformation of the bore can allow fluid to bypass the piston, reducing the amount of fluid delivered. Deformation of the bore can also cause the piston to chaff against a side of the bore, thereby causing premature wear of the piston. Because this problem was not recognized, divider blocks have not been designed to resist deformation.

The invention comprises a divider block that resists substantial deformation at high fluid pressures. Various embodiments can include a stronger housing with thicker walls surrounding the bore, the use of additional bolts to connect the divider block section to the intermediate base plates to prevent distortion and to distribute torque evenly to ensure sealing of the o-rings, eliminating the practice of recessing the bolts in counter bores, which weakens the divider block section, strengthening the base section by increasing its physical size, that is, using more metal to form the inlet, intermediate and end sections, and using larger heat treated tie rod bolts to assemble the base section to decrease flexing and ensure sealing of all o-rings and carefully tightening all bolts to their proper torque to prevent deformation. Not all of the measures are required for every application.

Applicant has also found that as the operating pressure increases, it becomes more important to balance the outlet pressures of the divider valve. When the outlet pressures are not balanced, pistons can move too rapidly, causing chaffing and premature wear. In accordance with another aspect of some embodiments of the invention, divider block outlets are pre-balanced using adjustable pressure valves that maintain a desired pressure at the outlets. In some embodiments, the divider block is designed to require balancing valves at each fluid outlet, unlike prior art divider blocks, which can typically be connected directly to an output pipe with or without a balancing valve.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed might be readily utilized as a basis for modifying or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, the following description is made with reference to the accompanying drawings, in which.

DETAILED DESCRIPTION OF THE PREFERRED EMBODIMENTS

To investigate the problem of compressors failures when the divider block providing lubrication to the compressor appear to be cycling normally, applicant built a test stand to measure the volumes of fluid dispensed from several commercially available divider blocks at various pressures. Applicant monitored the number of cycles and the nominal output volume at working pressures of up to about 5000 psi using proflo® monitors described in U.S. Pat. No. 5,835,372 and commercially available from CC Technology, Midland, Tex., the assignee of the present application. The proflo® monitor measures the number of cycles of a divider block and can report and trend the output volume of the divider blocks at each outlet point while the system is operating at actual operating pressures. Applicant also measured the actual volume of fluid dispensed into an outlet path of the divider, using a single inlet, single outlet divider block located in the fluid outlet path downstream of the divider block under test. A single inlet, single outlet divider block is described in U.S. patent application Ser. No 10/402,205, which is assigned to the assignee of the present invention and which is hereby incorporated by reference.

The results of applicant's tests were unexpected. Applicant found that the output volumes changed drastically at higher pressures. Applicant then determined that the change in output volume is caused by expansion of the piston bore under the high pressure. The expansion was found to be a significant fraction of the piston clearance. The clearance between the piston and bore of a typical divider block is about 0.0003 in. Applicant found that the stress of the high pressure caused the thin wall of the divider block bore to expand as much as 0.00017 in. This expansion allows the oil to leak around the piston to a lower pressure path, thereby changing the amount of fluid that is dispensed with each piston cycle and reducing the accuracy of the divider block.

Figure 1:
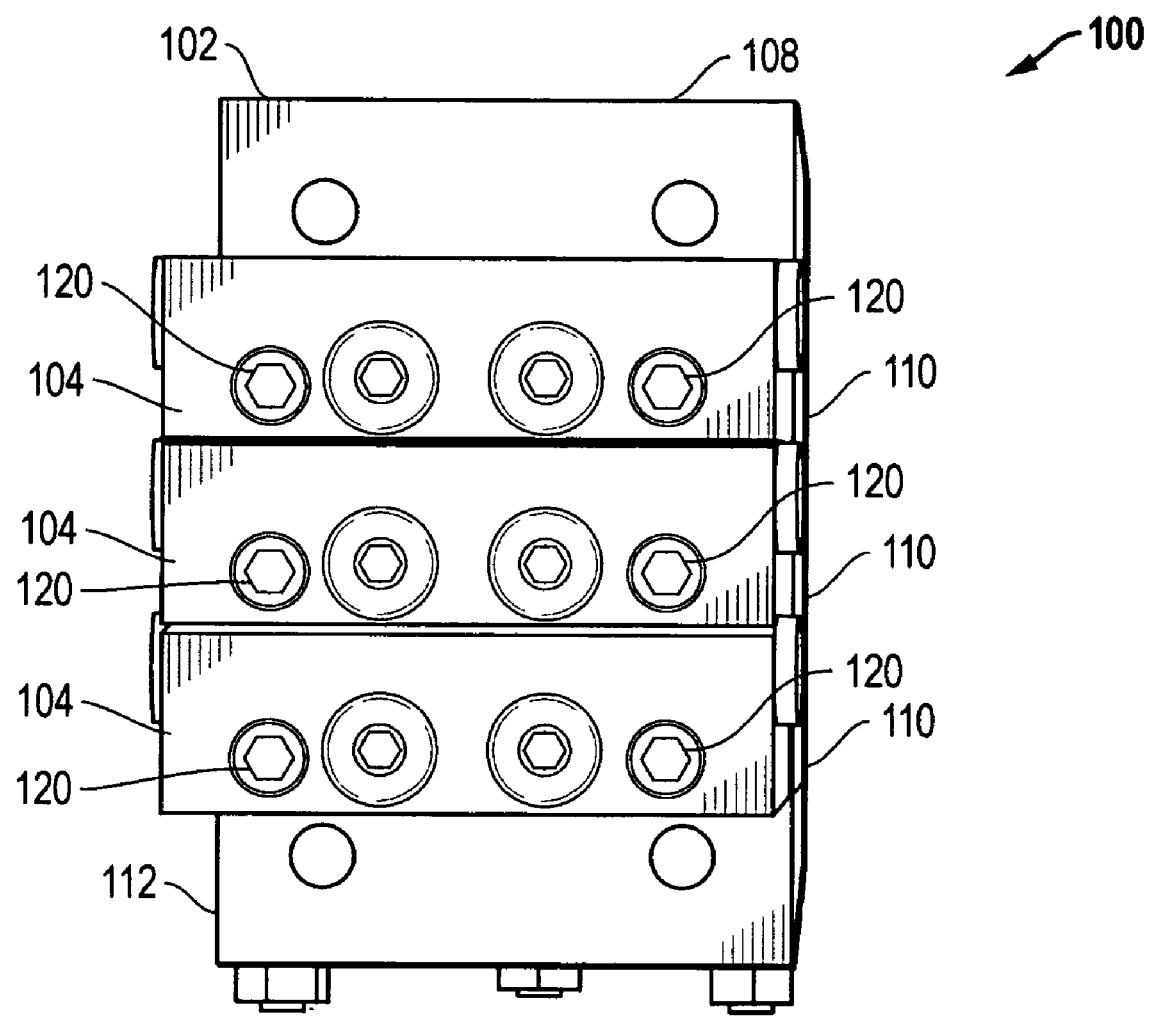
FIG. 1 is a front perspective view of a prior art divider block.
Figure 2:
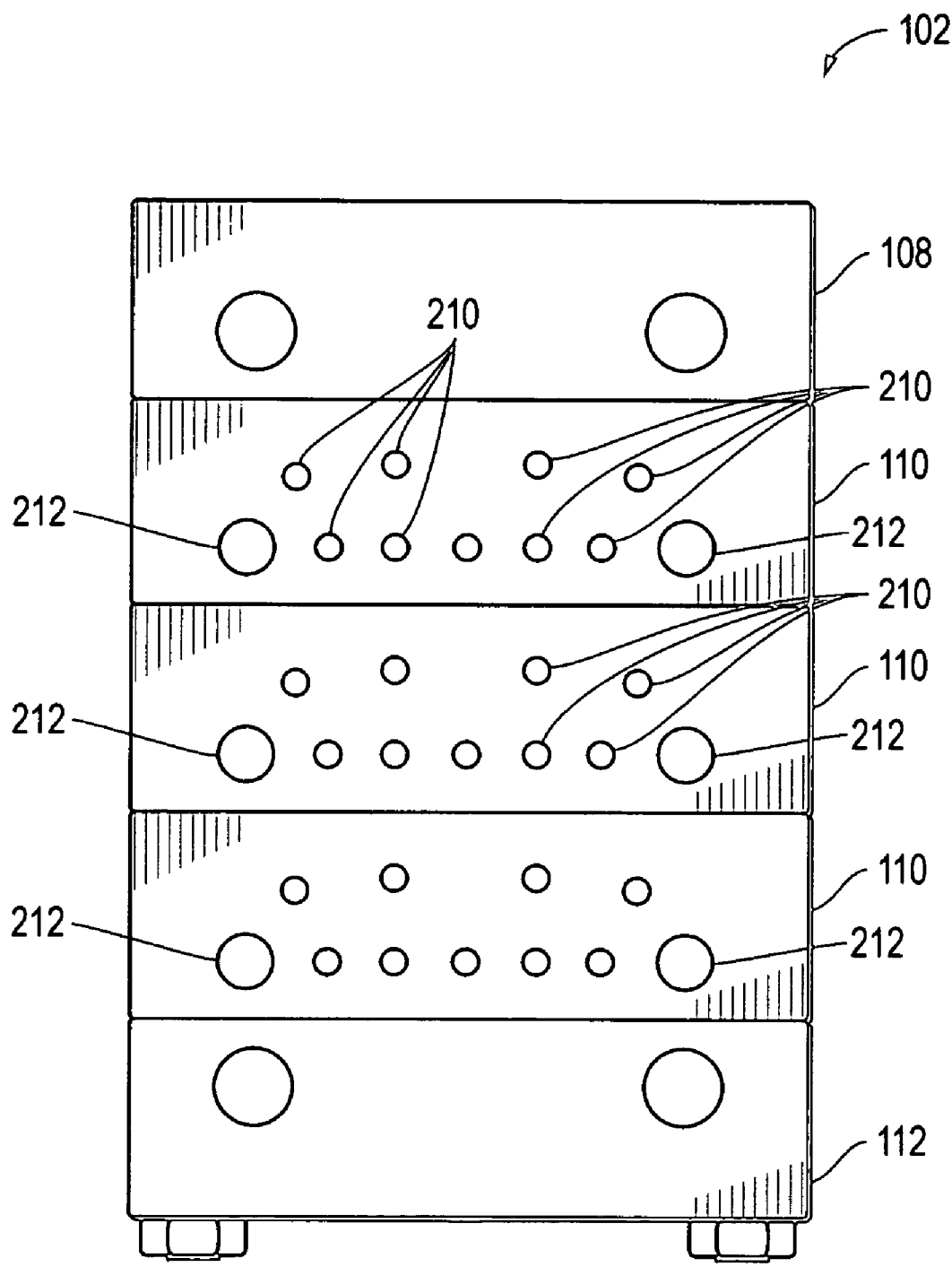
FIG. 2 is a front view of the base plate of the divider block of FIG. 1.
Figure 3:
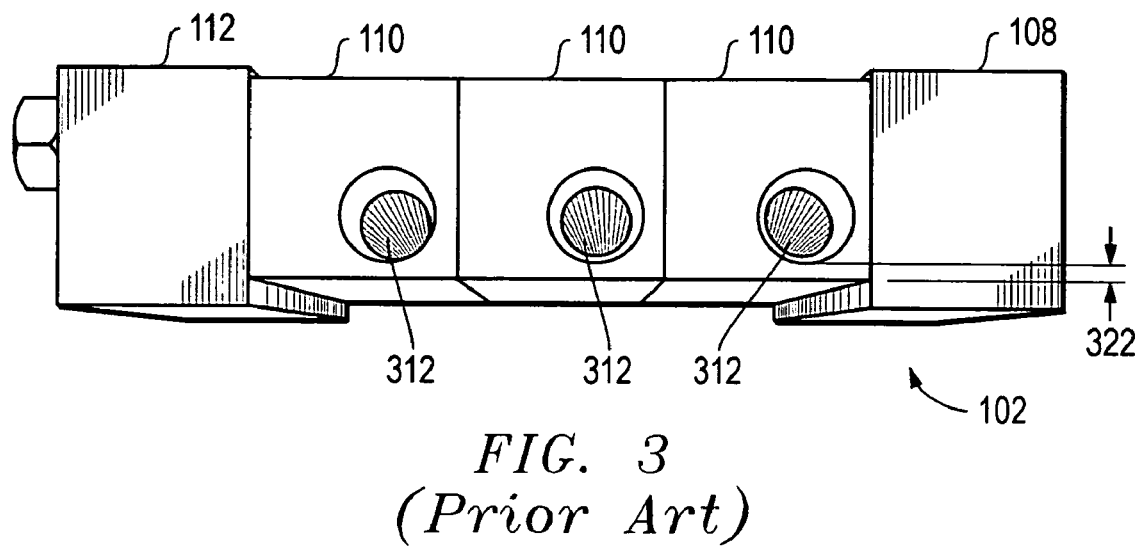
FIG. 3 is a side perspective view of the base plate of the divider block of FIG. 1.
Figure 4:
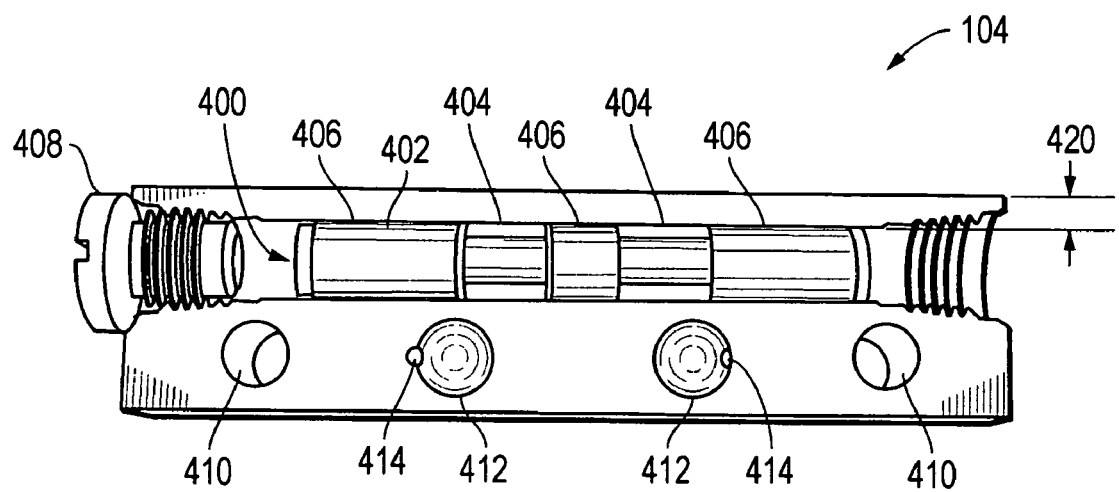
FIG. 4 is a cross-sectional view of a divider block section of the divider block of FIG. 1.
Figure 5:
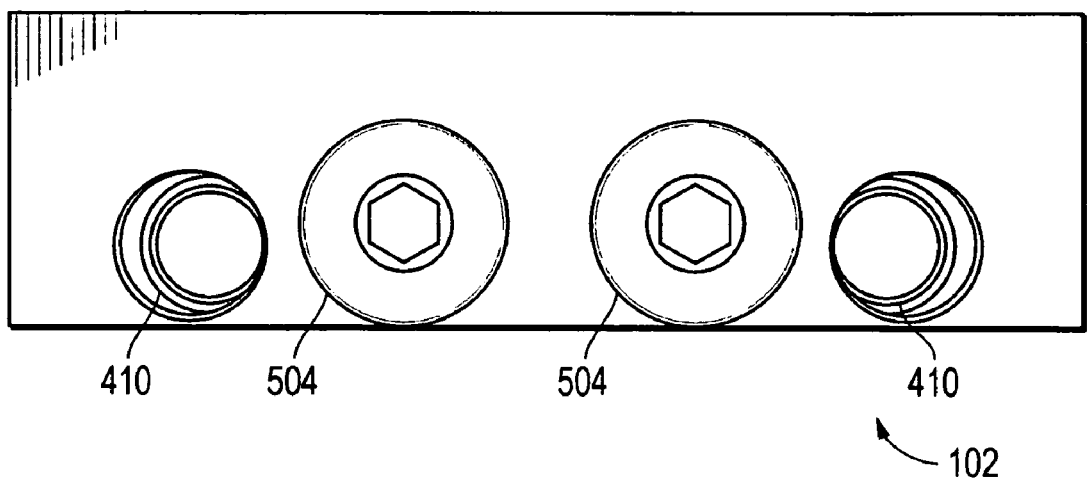
FIG. 5 is a front view of a divider block section of the divider block of FIG. 1.
Figure 6:
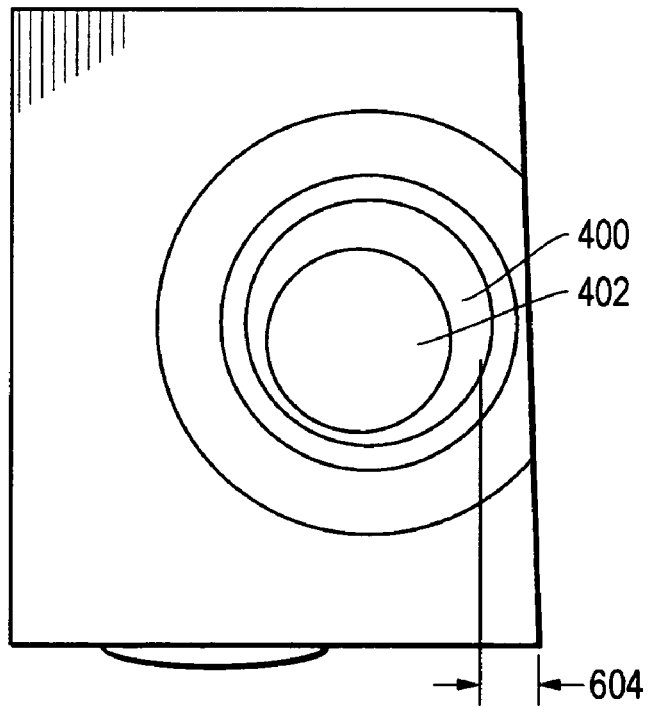
FIG. 6 is an end view of the divider block section of the divider block of FIG. 1.

FIGS. 3–6 illustrate some of the problem areas that applicant has discovered in a commercially available, prior art divider block assembly. FIG. 3 shows that the thickness 322 of intermediate base sections 110 at outlet ports 312 is not great. This thin area allows for expansion of the metal at high pressure, which allows fluid to pass around the piston and travel to a point of least resistance. FIG. 4 shows that the thickness 420 of material above the bore 400 in the divider block section 104 is not great, and is susceptible to deformation at high pressures. FIG. 4 also shows the relatively thin areas between bore 404 and counter bored bolt holes 410 and between bore 404 and inspection ports 412. FIG. 5 shows that bolt holes 410 are not centered on the divider block surface to prevent interference with internal fluid channels. Off-centered bolts apply asymmetric forces to the seals between the divider block section 102 and intermediate base plate 110, and can be overtightened in an attempt to reduce leaks. Overtightening can cause the piston bore to deform. FIG. 6 shows that the thickness 604 of material on the side of the piston bore is relatively small.

The thin wall on the top of the piston shown in FIGS. 4 and 6 expands and distorts in high-pressure applications, making prior art divider blocks unsuitable for use at higher pressures. Because lubrication pressures have been increasing in recent years, the industry needs a divider block that accurately dispenses fluid at mid pressure (greater than about 1,000 psi) to high pressure service (greater than about 3500 psi).

Table 1 below shows calculated stress, strain, and expansion (deformation) of various divider block piston bores at different pressures. Table 2 shows the characteristics of each of the blocks in Table 1. The stress "S," strain "O," and expansion were calculated as follows:

$$S = P*(ID+t)/2t,$$

in which "P" is the pressure in the cylinder in pounds per square inch (psi), "ID" is the inner diameter of the piston bore, and "t" is the thickness of the wall at the thinnest point;

$$\sigma = S/E,$$

in which E is the modulus of elasticity, 31,443,675−34,909.64*T, with T being the temperature in degrees Fahrenheit; and $$\text{Expansion} = \sigma * ID.$$

TABLE 1

| Block Number | Property | Pressure | | | | |
|---|---|---|---|---|---|---|
| | | 5000 | 4000 | 3000 | 2000 | 1000 |
| 6 | S (psi) | 4962.5 | 3970 | 2977.5 | 1985 | 992.5 |
| | σ (in/in) | 0.000197 | 0.000158 | 0.000118 | 7.89E−05 | 3.94E−05 |
| | Expansion (1/10,000 in) | 0.350 | 0.280 | 0.210 | 0.140 | 0.070 |
| 9 | S | 5756.135 | 4604.908 | 3453.681 | 2302.454 | 1151.227 |
| | σ | 0.000229 | 0.000183 | 0.000137 | 9.15E−05 | 4.58E−05 |
| | Expansion | 0.486 | 0.389 | 0.291 | 0.194 | 0.097 |
| 12 | S | 7313.462 | 5850.769 | 4388.077 | 2925.385 | 1462.692 |
| | σ | 0.000291 | 0.000233 | 0.000174 | 0.000116 | 581E−05 |
| | Expansion | 0.728 | 0.582 | 0.437 | 0.291 | 0.146 |
| 18 | S | 9028.261 | 7222.609 | 5416.957 | 3611.304 | 1805.652 |
| | σ | 0.000359 | 0.000287 | 0.000215 | 0.000144 | 7.18E−05 |
| | Expansion | 1.078 | 0.862 | 0.647 | 0.431 | 0.216 |
| 24 | S | 12508.33 | 10006.67 | 7505 | 5003.333 | 2501.667 |
| | σ | 0.000497 | 0.000398 | 0.000298 | 0.000199 | 9.94E−05 |
| | Expansion | 1.791 | 1.433 | 1.075 | 0.716 | 0.358 |
| 30 | S | 13759.38 | 11007.5 | 8255.625 | 5503.75 | 2751.875 |
| | σ | 0.000547 | 0.000438 | 0.000328 | 0.000219 | 0.000109 |
| | Expansion | 1.970 | 1.576 | 1.182 | 0.788 | 0.394 |

TABLE 2

| Block Number | Inner Diameter of Piston Bore (inches) | Thinnest Wall Section (inches) | Temperature (Degrees F) |
|---|---|---|---|
| 6 | 0.177 | 0.18 | 180 |
| 9 | 0.212 | 0.163 | 180 |
| 12 | 0.250 | 0.13 | 180 |
| 18 | 0.300 | 0.115 | 180 |
| 24 | 0.360 | 0.090 | 180 |
| 30 | 0.360 | 0.080 | 180 |

Table 1 shows, for example, that block number 30, which Table 2 shows as having an inner diameter of 0.360 in. and a minimum wall thickness of 0.080 in., will expand by 0.000118 in. at 3000 psi operating pressure and by 0.000197 in. at 5,000 psi. These expansions are a significant fraction of the piston clearance of 0.0003 and can significantly reduce dispensing accuracy. Having recognized that the equipment failure can be caused by inaccurate dispensing at middle to high pressures, a divider block of the present invention can be designed to reduce deformation and improve dispensing volume accuracy.

A preferred embodiment of the invention is capable of delivering accurate volumes of oil in high-pressure service, that is, at pressures greater than about 3,500 psi. Such a block resists significant deformation, that is, deformation that causes the accuracy of the block to vary from the nominal fluid volume by more than 15%. A preferred divider block reduces deformation to ensure an accuracy of better than 15% at pressures of about 3500 psi, more preferably better than 10% at 3500 psi, and most preferably better than 5% at 3500 psi. Of course, such blocks also have improved accuracy at higher pressures, including 5,000 psi.

A preferred divider block capable of reliable operation in high pressure applications incorporates several changes and additions to the complete system. Not every embodiment of the invention necessarily includes all of the improvements described below.

Figure 7:
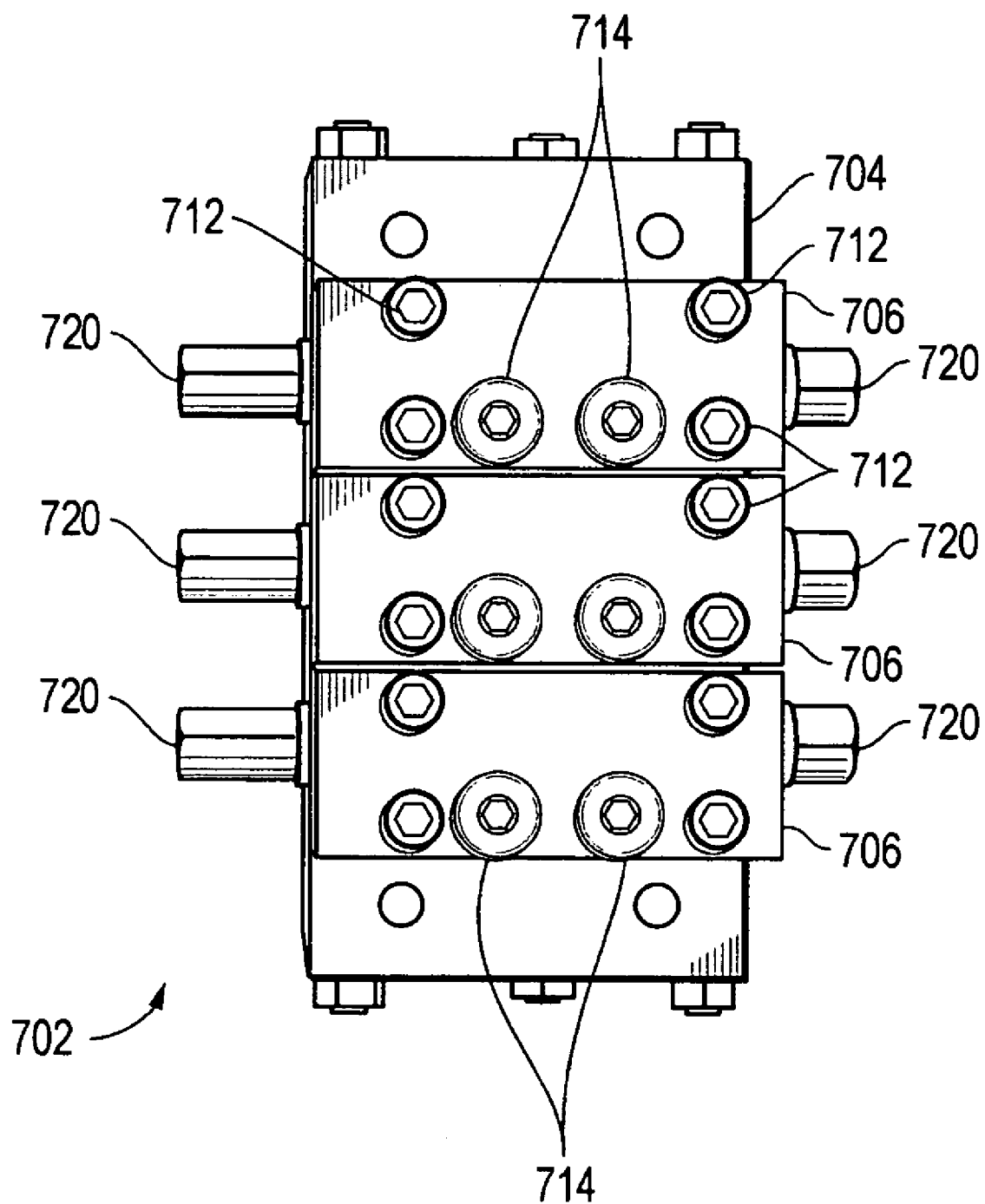
FIG. 7 is a front perspective view of a divider block embodying principles of the present invention.

FIG. 7 shows a preferred embodiment of the invention referred to as an XD ("extreme duty) divider block assembly 702. Preferred divider block assembly 702 includes a base plate 704 and three divider blocks sections 706. Each divider block section is preferably attached to the base plate 704 using 4 bolts 712, instead of two bolts like in prior art divider blocks. Using four bolts allows for a symmetric tightening force, while the bolt holes do not interfere with internal passages of the divider block section 706. Two plugs 714 for each divider block section 706 cover an inspection port. Check valves 720, preferably stainless steel poppet-type valves with integral tube connections, are attached to all fluid outlets.

Figure 8A:
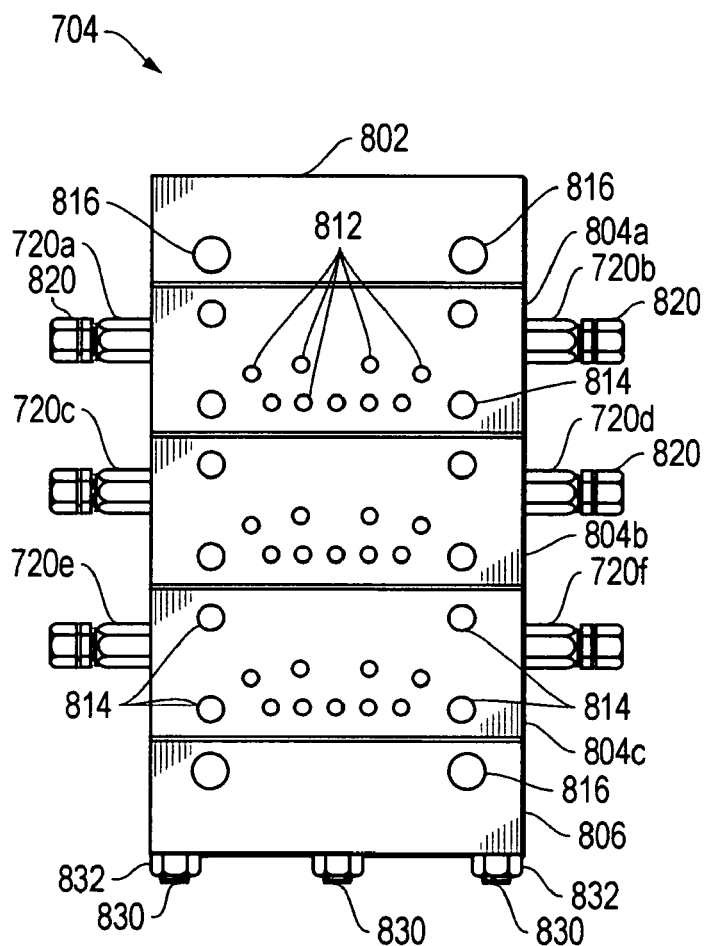
FIGS. 8A and 8B are, respectively, a front view and a side view of a base plate used with the divider block of FIG. 7.
Figure 8B:
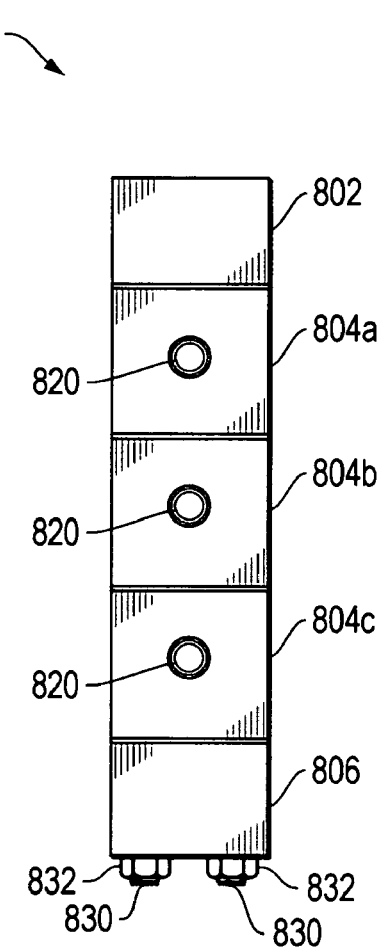

FIGS. 8A and 8B show a front view and a side view, respectively, of preferred base plate 704 without divider blocks sections 706 mounted thereon. Base plate 704 includes an inlet section 802, an end section 806, and three intermediate base plate sections 804a, 804b, and 804c, on which three divider blocks sections (not shown) can be mounted. Holes 812 pass fluid between intermediate base plate sections 804 and the corresponding divider block section 706. Threaded bolt holes 814 accept bolts for attaching divider block sections 706. Holes 816 are for mounting the complete divider block assembly.

Attached to balancing valves 720a–720f are tubing connectors 820 for tubing that delivers the lubricant to a point of use or subsequent divider block. The multiple sections of the base plate 704 are preferably assembled using three tie rod bolts 830 (also referred to as manifold bolts) and nuts 832. Tie rod bolts 810 are preferably 0.313 in. or larger in diameter and heat-treated. Proper torque is applied to the base plate manifold bolts to ensure that the bolts are sufficiently tight to resist deformation and flexing from the high pressure and to ensure an even force on the o-rings (not shown) between the sections of the base plate for proper sealing to prevent leaking. The larger, heat treated tie rod bolts resist stretching under the extra torque applied when tightening them. The proper torque ensures the bolts are stretched to factory specifications during assembly and will not detrimentally expand after the system is installed on the compressor or piece of machinery when temperatures and pressures are elevated. While the invention could be used with the prior art-type threaded insert, that fasten each section to the adjacent section, the use of longer bolts that hold the entire assembly together allows for uniform tightening, and eliminates the problem of stripping threads, which occurs with the prior art threaded inserts.

O-rings (not shown) are positioned between all the base plate sections and between the check valves 720a–720f and their respective intermediate base plate sections 804a–804c. O-rings are preferably made of 90 durometer, peroxide cured Viton, which resists becoming brittle in high temperature applications and is compatible with synthetic and mineral based oils. Additional intermediate base plate sections 804 can be added, along with additional divider block sections 706, as needed to provide additional fluid outlets.

Figure 9A:
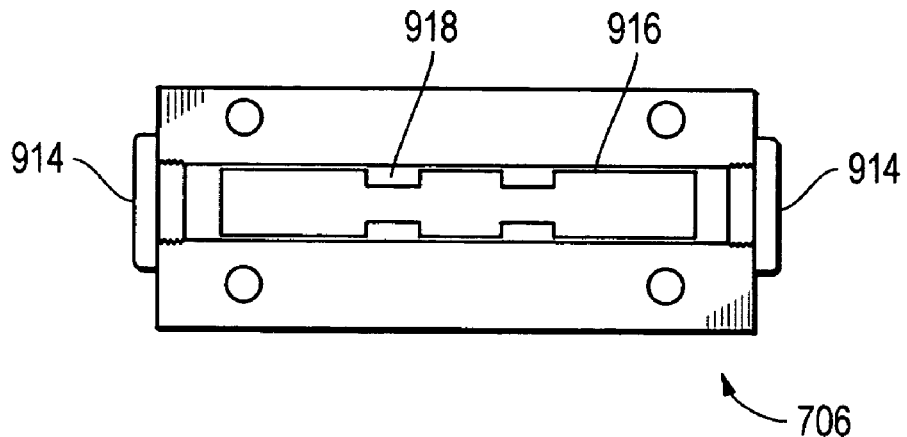
FIGS. 9A, 9B, and 9C are, respectively, a sectional view, a front view, and an end view of a divider block section of the divider block assembly of FIG. 7.
Figure 9B:
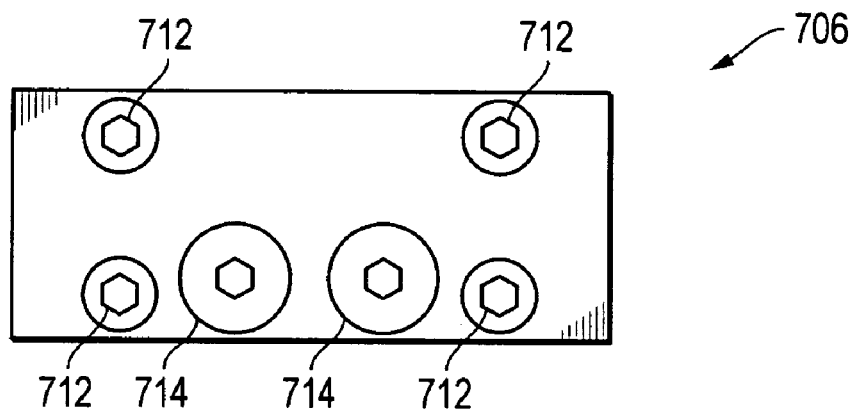
Figure 9C:
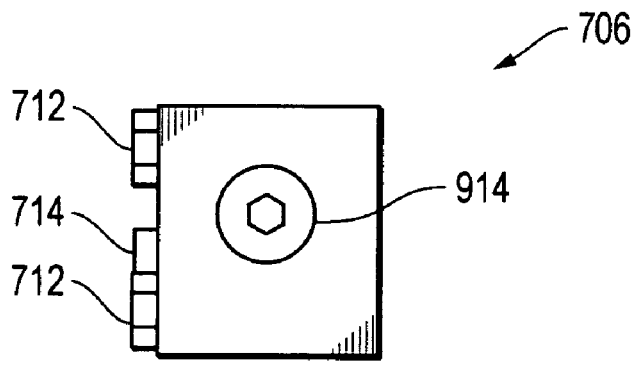

FIGS. 9A, 9B, and 9C show divider block section 706 in more detail. FIG. 9A shows a front sectional view, FIG. 9B shows a front view, and FIG. 9C shows a side view. FIG. 9A shows a piston 916 within a piston bore 918 sealed by piston enclosure plugs 914. FIGS. 9A–9C show that divider block section 706 is designed with sufficient metal surrounding the piston bore 918 to eliminate the flexing and distortion when operating under high pressures. FIG. 9C shows that the heads of bolts 712 are flush with the surface of divider block section 706, that is, divider block section 706 does not include counter bores for recessing mounting screws 712, thereby avoiding a reduction in thickness of material around bore 918. While this adds to the overall thickness of diver block assembly 702, applicant has found that the additional thickness is acceptable to produce a more accurate divider block and less opportunity to distort the bore from over tightening.

Figure 10:
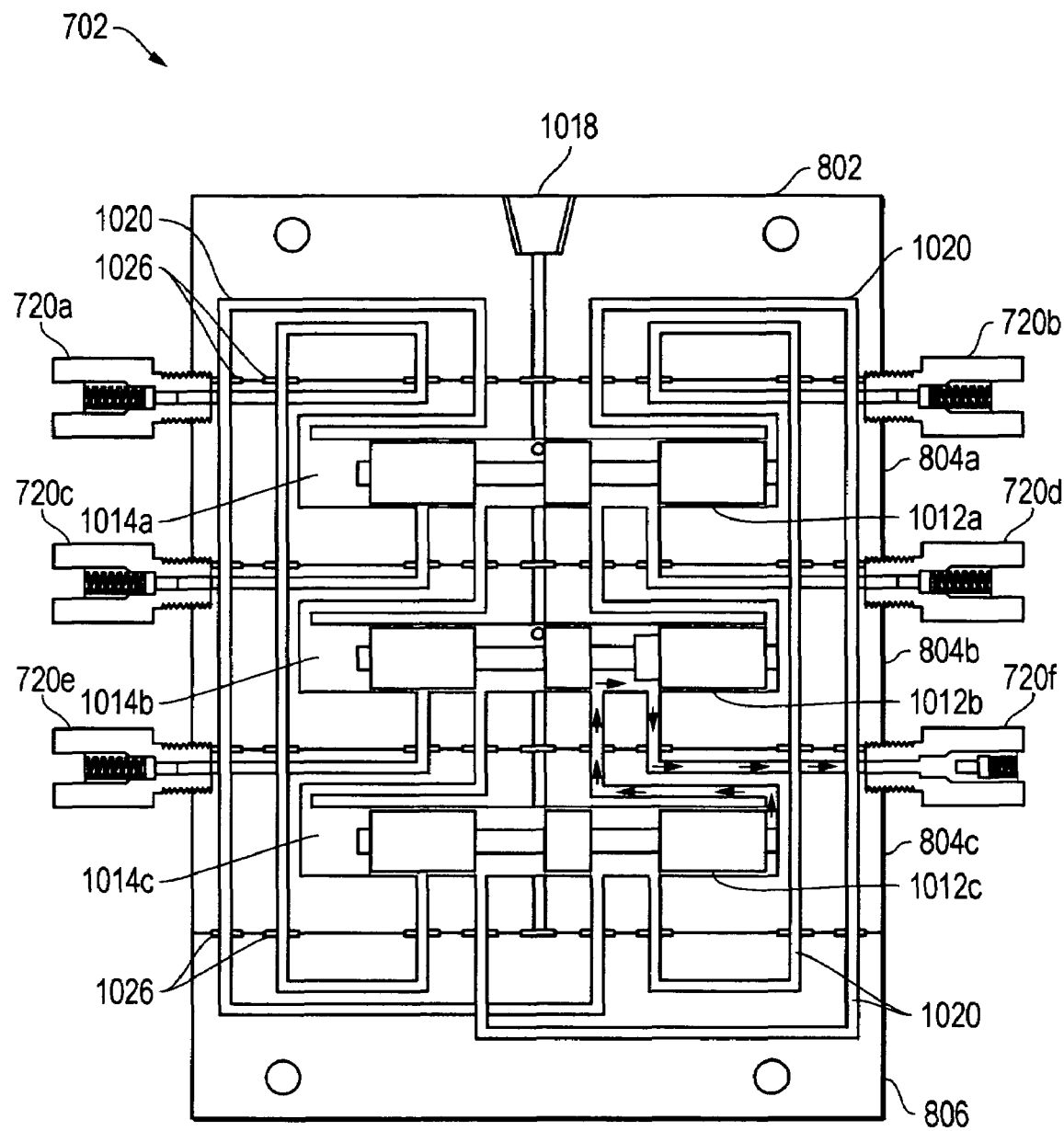
FIG. 10 shows schematically the fluid flow within the divider block of FIG. 7 during one part of its cycle.
Figure 11:
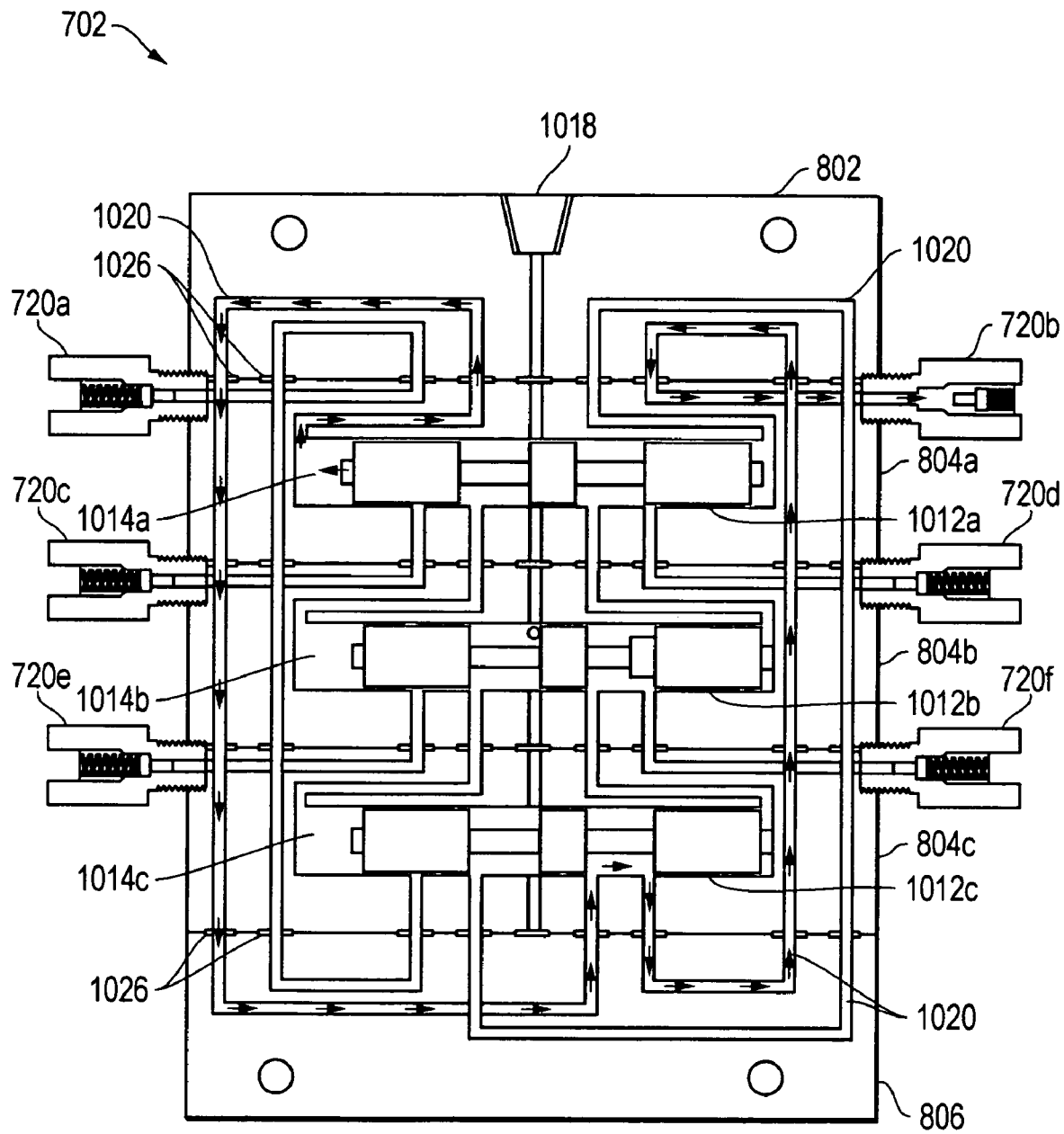
FIG. 11 shows schematically the fluid flow within the divider block of FIG. 7 during a part of its cycle following the part shown in FIG. 10.

FIGS. 10 and 11 shows schematically how divider block assembly 702 functions. FIG. 10 shows internal passages 1020 in the input section 802, the three intermediate sections 804a, 804b, and 804c, and the end section 806. Within intermediate sections 804a, 804b, and 804c are three pistons 1012a, 1012b, and 1012c within three piston bores 1014a, 1014b, and 1014c. The lubricant enters divider block 102 at inlet 1018 in input section 802 and causes pistons 1012a, 1012b and 1012c to move back and forth, opening and closing passages and causes the lubricant to flow through fluid channels 1020 to outlet check valves 720a–720f. O-rings 1026 seal the fluid within the channels 1020 as the channels 1020 pass between the sections, which are held together by bolts as shown in FIG. 8.

In the piston positions shown in FIG. 10, piston 1012c has just finished forcing a volume of fluid through check valve 720f, and the channels are now set for pistons 1012a to push fluid out through a channel to check valve 720b as shown in FIG. 11. The design of the fluid paths in divider blocks is well known. The volume of fluid dispensed can be determined from the cross sectional area of the bore and the distance traveled by the piston 1012c as it pushes the fluid.

Figure 12A:
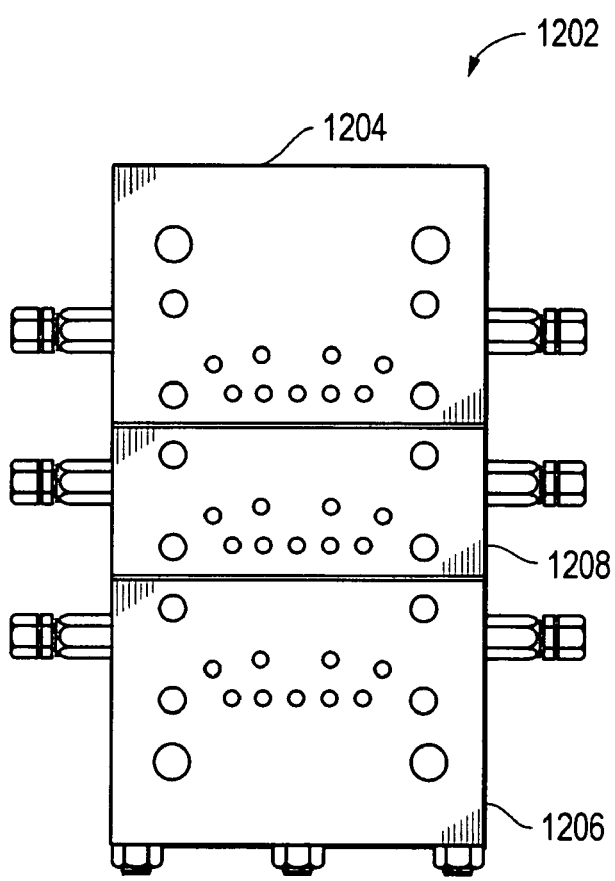
FIGS. 12A and 12B are, respectively, a front view and a side view of an alternative embodiment of a base plate used with the divider block of FIG. 7.
Figure 12B:
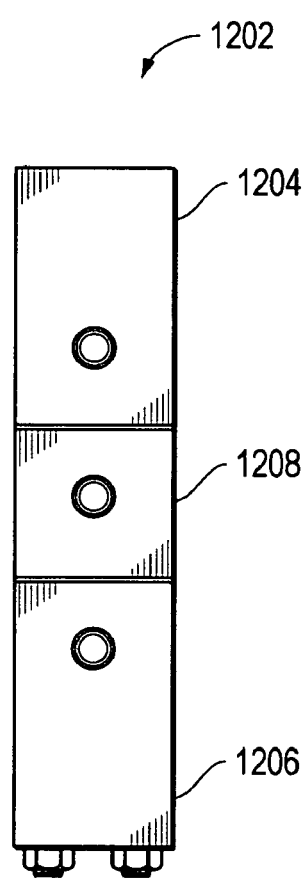

FIG. 12A is a front view and FIG. 12B is a side view of an alternative embodiment for a base plate 1202 for use with divider block assembly 702. Base plate 1202 includes an inlet section 1204, an end section 1206, and an intermediate base plate 1208. Inlet section 1208 includes an integral intermediate base plate section for mounting a divider block section 706. Similarly, end section 1206 includes an integral intermediate base plate section for mounting a divider block section 706. Thus, base plate 1202 includes only three base components, yet accommodates three divider block sections 706. By eliminating two base sections compared to the embodiment of FIG. 8A and 8B, this embodiment reduces the number of fluid connections and therefore reduces the possibility of leaks. Additional intermediate base plate sections 1208 can be added, along with additional divider block sections 706, as needed to provide additional fluid outlets.

Applicant has discovered several problems that make prior art divider blocks unsuitable for use at high pressures. The preferred embodiments of the invention described above address these concerns. One problem is that piston bore walls are too thin in places, which allows the walls to deform under fluid pressure. Another problem is caused by inadequate fastener designs, such as too few mounting bolts or weak tie rods used to assemble the divider block components. The divider block must be assembled tightly to prevent leakage between the components. Users try to compensate for an inadequate design by overtightening the fasteners to prevent leaks, and the overtightening can deform the piston bore. Yet another problem is the failure to balance the output pressures of the divider block. Each of these problems and some preferred solutions are described in more detail below.

A preferred divider block assembly, such as that shown in FIG. 7, includes a balancing check valve at each working outlet to prevent oil, gas, and or air from back flowing into the divider block system and to balance the pressure at the different outlets. In some applications, the balancing check valves can use Viton sealing elastomers in the form of a poppet seal (poppet check valve). In high temperature applications, the valve can use a metal-to-metal seal, such as a stainless steel ball seating against a machined sealing surface. The design of a preferred base plate outlet includes an integral check valve, that is, a check valve that is part of the divider block design, as opposed to prior art designs in which check valves were optional accessories. For example, one preferred base plate is designed with non-pipe threads and o-ring sealed outlets. These outlets accommodate an o-ring sealing check valve, and the non-pipe threads prevent users from using thread sealing products such as Teflon tape or thread sealing liquids which may cause problems if introduced into the hydraulic circuit.

While add-on balancing valves have been available as a relatively expensive option on divider blocks, and balancing valves were considered by many to be unnecessary on lower pressure systems. Applicant has found that in many instances, a divider block system does not function reliably in applications with pressures over 800 psi without the use of the balancing valves, particularly in application in which the output pressure varies greatly, that is, by more than 800 psi or 1000 psi. In applications where there is excessive pressure on several of the lubrication points, there is preferably a balancing valve on every outlet that has a lower working pressure to ensure the system is balanced with equal pressures on each outlet.

Without balancing valves, when the system distributes lubrication from an outlet at, for example, at 2000 psi, then progressively changes to an outlet at 100 psi, the pressure can cause the piston in the low pressure piston bore to move too rapidly and contact the end plugs on the divider block, causing deformation of the piston and premature failure of the divider block. Lack of the balancing valve can also cause oil to leak past the divider block piston to a lower pressure path. When this occurs the lubrication point of higher pressure does not receive the needed quantity of oil, which in turn causes premature wear or failure of compressor or machinery components.

A preferred divider block, therefore, includes integral balancing valves that can incorporate a variety of springs to keep the poppet or ball closed when oil is not being injected through the outlet. An appropriate spring is chosen to balance the pressure in each outlet to reduce pressure differentials within the divider valve assembly. For example, if the divider block systems maximum operating pressure at any outlet is 1800 psi, balancing check valves should be installed on all outlets of the system so that each outlet requires a pressure of 1800 psi to open the valve. For example, if the outlet pressure at one outlet were 600 psi, a spring would be installed to provide an additional cracking pressure of 1200 psi so that a total of 1800 psi would be required to open the outlet valve. This system will then be correctly balanced, and all outlets will see the same pressure, 1,800 psi. Because the design of a preferred base plate intermediate section requires a check valve at the exit, the user only needs to choose a spring of the appropriate stiffness to place in each balancing valve, and little or no additional cost is incurred to balance the system. Also, incorporating check valves with tube connections into the design of the divider block assembly eliminates additional leak paths in the system caused by adding the balancing valves.

Inadequate fastener designs is another problem of prior art divider blocks that is addressed by some embodiments of the present invention. Prior art industry standard divider blocks attached to the base plate with only two screws, and applicant has found that the mounting screws can easily be over tightened and cause distortion to the divider block bore. Egg shaped distortion of the piston bore causes the piston to put excessive pressure against the back and front of the divider block bore which in turn causes the divider block to wear and fail prematurely. When the divider block mounting screws are over tightened the piston in the bore cannot move fluidly, the system pressure is elevated and the piston to bore clearance is compromised causing the system to fail prematurely creating wear or failure to the compressor or machinery components. If the lubrication system incorporates a pressure gauge the operator can detect the elevated pressure, but 85% of the compressor lube systems are installed without a pressure gauge. A preferred divider block of the invention is designed to mount on the base plate with four mounting screws to evenly distribute the torque needed to hold the divider block in a stable position with equal torque spread evenly across the block, thereby eliminating the problems with distortion of the block and ensure all o-rings seals between the divider block and base plate are compressed equally to ensure reliable sealing. A preferred embodiment also includes larger, heat treated tie rods to assemble the base plate sections. Such tie rods maintain an adequate torque over time without initial overtightening.

The invention has broad applicability and can provide many benefits as described and shown in the examples above. The embodiments will vary greatly depending upon the specific application, and not every embodiment will provide all of the benefits and meet all of the objectives that are achievable by the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A divider block assembly for distributing a low volume of a fluid at high pressure, comprising:
    a base plate including an inlet section, an end section, and one or more intermediate base sections, each intermediate base section including a fluid outlet;
    one or more divider block sections mounted on the one or more immediate base sections, the divider block section having a piston bore for receiving a piston; and
    a balancing valve at each of the fluid outlets, each fluid outlet including non-pipe threads and a sealing device for attaching the balancing valve to the intermediate base section.

2. The divider block assembly of claim 1 in which multiple divider block sections are mounted on multiple intermediate base sections, and in which the balancing valves maintain the output pressures within 500 psi at each fluid owlet.

3. The divider block assembly of claim 1 in which each divider block section is attached to a corresponding intermediate base section by more than two threaded fasteners.

4. The divider block assembly of claim 3 in which each divider block section is attached to a corresponding intermediate base section by four threaded fasteners.

5. The divider block assembly of claim 1 in which the inlet section, the end section, and the one or more intermediate base sections are held together by four or more heat treated fasteners having diameters of greater than 0.300 in. and further comprising o-rings positioned at fluid connections between the connected sections to prevent leaking of fluid flowing between sections.

6. The divider block assembly of claim 1 in which the inlet section and at least one intermediate base section are combined into a single block.

7. The divider block assembly of claim 1 in which the end section and at least one intermediate base section are combined into a single block.

8. The divider block assembly of claim 1 in which the base plate comprises a single block including the inlet section and an intermediate section, a single block including an end section and an intermediate section, and an additional intermediate section.

9. The divider block assembly of claim 1 in which each divider block section includes solid material around the bore, the solid material having sufficient thickness to resist significant deformation at pressures greater than 2000 psi, each fluid outlet including non-pipe threads and a sealing device to attaching the balancing valve to the intermediate base section.

10. The divider block assembly of claim 9 in which the bore expands less than 0.00001 in. at 2000 psi.

11. The divider block assembly of claim 9 in which the bore expands less than 0.00001 in. at 3,500 psi.

12. The divider block assembly of claim 9 in which the bore has an inner diameter of 0.30 in. or greater and expands less than 0.000075 in. at 3,000 psi.

13. The divider block assembly of claim 9 in which the bore has an inner diameter of 0.30 in. or greater and expands less than 0.00005 in. at 3,000 psi.

14. The divider block assembly of claim 9 in which the bore has an inner diameter of 0.15 in. or greater and expands less than 0.000015 in. at 3,000 psi.

15. The divider block assembly of claim 9 in which the bore has an inner diameter of 0.300 in. or greater and expands less than 0.00001 in. at 3,000 psi.

16. The divider block assembly of claim 9 in which the bore has an inner diameter of about 0.360 in. or greater and expands less than 0.0001 in. at 3,000 psi.

17. The divider block assembly of claim 9 in which the bore has an inner diameter of about 0.360 in. or greater and expands less than 0.00005 in. at a 3,000 psi.

18. The divider block assembly of claim 9 in which the solid material around the bore having sufficient thickness to resist significant deformation at 7,500 psi.

19. The divider block assembly of claim 9 in which the solid material around the bore having sufficient thickness to resist significant deformation at 10,000 psi.

20. The divider block assembly of claim 9 in which the solid material around the bore has a thickness of at least 0.400 in. in at its thinnest part.

21. The divider block assembly of claim 9 in which the volume of fluid dispensed is accurate to within 10% at 3000 psi.

22. The divider block assembly of claim 9 in which the volume of fluid dispensed is accurate to within 10% at 5000 psi.

23. The divider block assembly of claim 9 in which the volume of fluid dispensed is accurate to within 5% at 3000 psi.

24. The divider block assembly of claim 9 in which the volume of fluid dispensed is accurate to within 5% at 5000 psi.

* * * * *